Patented Dec. 16, 1924.

1,519,268

UNITED STATES PATENT OFFICE.

CHARLES W. SCHNELL, OF FRESNO, CALIFORNIA.

COMPOSITION FOR USE IN AUTOMOBILE TIRE CASINGS.

No Drawing. Application filed September 4, 1920. Serial No. 408,148.

*To all whom it may concern:*

Be it known that I, CHARLES W. SCHNELL, a citizen of United States, residing at Fresno, in the county of Fresno and State of California, have invented new and useful Improvements in Compositions for Use in Automobile Tire Casings, of which the following is a specification.

The present invention relates to a powder which is to be used in the dry form by sprinkling a small amount thereof into the casing of an automobile tire, after which the composition may be spread around evenly over the inner surface of the tire casing, to prevent friction and heating and wear which are caused by the rubbing of the inner tube against the inner surface of the tire casing. It is well known that in the operation of an automobile, there is considerable friction and consequent wear of the inner tube, caused by the rubbing of the inner tube against the casing, and it is the object of the present invention to provide a composition which can be placed in the casing, thereby preventing the said friction and consequent rapid wearing out of the inner tube.

In accordance with the present invention, I employ in the composition preferably three ingredients as mentioned below, these ingredients being preferably employed in the proportions stated.

In preparing the composition I take a given quantity, say, 100 parts by weight of graphite, and reduce this to an impalpable powder. With this is incorporated about 35 parts by weight of lampblack, and also preferably about 65 parts of powdered uncalcined mica.

In producing the compound the three ingredients may be ground together, in order to produce in the grinding operation a complete and intimate mixture of the powdered materials.

It is advisable to reduce the material to an extremely finely-divided condition, viz, an impalpable powder, so as not to leave any gritty particles which could act to abrade or cut the surface of the inner tube. The composition can be applied to new tires at the time of first putting the same onto the wheels or it can likewise be applied to old tires, for example, at the time of changing the tires for repairs, or at any other suitable time.

The composition effectively produces the results above referred to.

The composition thus once applied to a particular tire casing will to a certain extent be taken up or will adhere to the interior of the casing, and this composition will not wear out. It may to some extent be removed if it should be necessary to frequently remove the tire casing, and for this purpose a small additional quantity of the composition can be placed in the casing whenever the inner tube has to be taken out or renewed.

While the composition can be applied to the tire in any desired quantity, I find that excellent results are produced by the use of 2 ounces of the composition in an ordinary-sized automobile tire.

Finely-powdered soapstone or talc can be substituted for a part of the powdered mica, with the production of fairly good results. Accordingly, the term "mica" as used in the specification and claims, is intended to cover the use of talc, whether substituted for all or a part of the mica. When so substituting, a pound of the talc is equivalent to a pound of mica, approximately.

The use of the powders, all mixed together, is found in practice to greatly protect the life of the inner tube. It prevents the inner tube from getting out of shape and also preserves the fabric in the tire casing. The powder also stops the tread and fabric from separating, thereby preserving the tire and giving an additional 25% to 50% more miles wear than could be secured without the use of this powder.

I claim:

1. A composition of matter for employment in the casings of automobile tires, the said composition comprising powdered graphite, powdered mica and lampblack.

2. The herein described composition of matter suitable for placing in the casings of automobile tires, the same comprising a pulverulent mixture of about 100 parts of graphite, about 35 parts of lampblack and about 65 parts of mica.

In testimony whereof I affix my signature.

CHARLES W. SCHNELL.